(No Model.)
W. E. CANEDY.
DEVICE FOR CONVERTING MOTION.
No. 445,922. Patented Feb. 3, 1891.
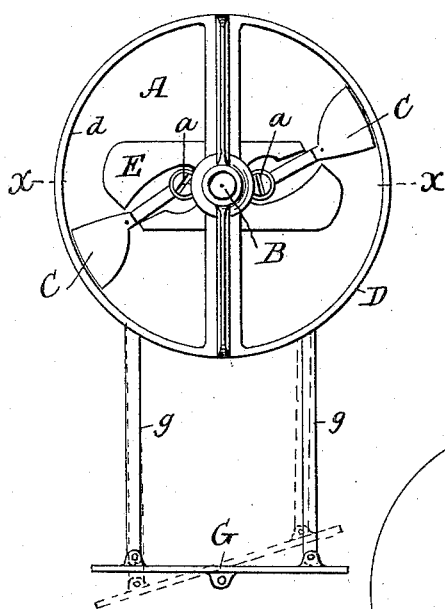
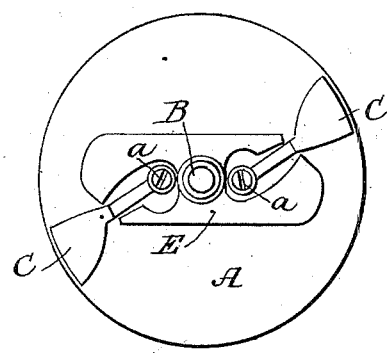
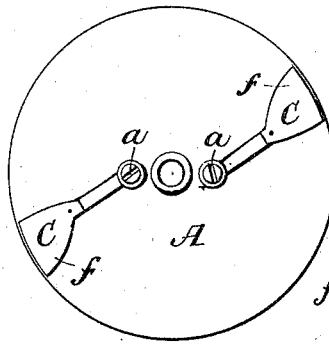
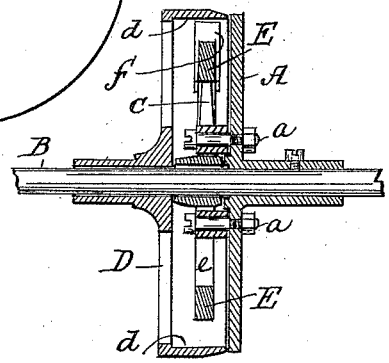
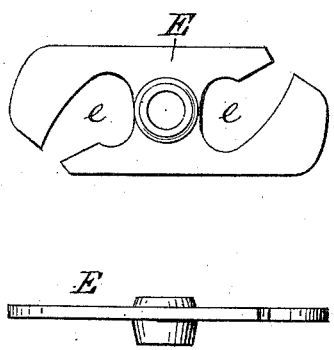
Witnesses
Sam! R. Turner.
Van Buren Hillyard.
Inventor
William E. Canedy.
By his Attorneys
R.S. & A.P. Lacey

UNITED STATES PATENT OFFICE.

WILLIAM E. CANEDY, OF DOWNER'S GROVE, ILLINOIS.

DEVICE FOR CONVERTING MOTION.

SPECIFICATION forming part of Letters Patent No. 445,922, dated February 3, 1891.

Application filed May 17, 1890. Serial No. 352,124. (No model.)

*To all whom it may concern:*

Be it known that I, WILLIAM E. CANEDY, a citizen of the United States, residing at Downer's Grove, in the county of Du Page and State of Illinois, have invented certain new and useful Improvements in Devices for Converting Motion; and I do hereby declare the following to be a full, clear, and exact description of the invention, such as will enable others skilled in the art to which it appertains to make and use the same.

This invention relates to friction-clutches, and aims to provide a simple construction for converting an intermittent motion into a continuous rotary motion that will be compact in its arrangement and efficient in its operation, and which can be readily changed to adapt it for a right or a left hand motion, and in which the diametrically-opposite pawls will be caused to operate in unison.

The improvement consists, essentially, in a yoke or coupling-plate concentrically mounted with the wheel or pulley and the pawl-carrying disk, and which is in engagement with the pawls to effect a movement of the same in unison to cause their engagement with or disengagement from the rim of the rotary pulley.

The improvement further consists of the novel features and the peculiar construction and combination of the parts, which will be hereinafter more fully described and claimed, and which are shown in the annexed drawings, in which—

Figure 1 is a side view of a clutch embodying my invention. Fig. 2 is a side view of the invention, the pulley being removed. Fig. 2ª is a side view of the intermittently-rotated plate, the yoke or coupling-plate and the pulley being removed. Fig. 3 is a view of the yoke or coupling detached. Fig. 4 is a cross-section on the line X X of Fig. 1.

The plate A is secured on the shaft B, and is provided with the diametrically-opposite pawls C, which are pivotally connected therewith by the bolts $a$. These pawls have their free ends expanded and tapering in thickness and covered with leather or similar material $f$ to insure a firm and noiseless engagement with the rim $d$ of the pulley D, which is loosely mounted on the said shaft. The yoke or coupling-plate E is mounted on the shaft B and is engaged with the pawls C C, the engagement being effected by providing notches or recesses $e$ in the said yoke to receive the said pawls. These notches $e$ are enlarged at their inner ends to permit a free movement of the pawls therein and are contracted at their outer ends to embrace the sides of the said pawls, as shown, so as to cause them to move simultaneously. The notches $e$ are formed in the diagonally-opposite edges of the yoke or coupling-plate, as shown, to permit the pawls to extend in an oblique direction, whereby they will bind against the rim of the pulley D when they approach radii having the shaft B for their center.

The operation of the device is as follows: The plate A is intermittently operated back and forth by any suitable means, as treadle G and the pitmen $g$ $g$. When the plate moves back, the pawls ride on the yoke and are held from the rim, and when moved forward the pawls bind on the said rim and carry the pulley around with it. To reverse the motion the pawls are detached and reversed, the yoke or coupling-plate being likewise reversed.

Having thus described my invention, what I claim, and desire to secure by Letters Patent, is—

1. The combination, with the intermittently-operated plate and the pulley, of the pawls having pivotal connection with the said plate and the independent coupling or yoke concentrically mounted with the pulley and plate and adapted to have an independent motion, and having engagement with the said pawls to effect a simultaneous movement of the pawls, substantially as described.

2. The combination, with the intermittently-operated plate and the pulley, of the pawls pivoted to the said intermittently-operated plate and the coupling or yoke concentrically mounted with the pulley and plate and having an independent motion on its axis, and having notches to receive the shanks of the pawls, substantially as described.

3. The combination of the shaft B, the intermittently-operated plate A, and the pulley D, mounted on the shaft, the pawls pivoted at their inner ends to plate A, and the coupling or yoke E, mounted on shaft B and free to turn thereon, and having notches $e\ e$ at its opposite ends to receive the pawls, substantially as set forth, for the purpose described.

In testimony whereof I affix my signature in presence of two witnesses.

WILLIAM E. CANEDY.

Witnesses:
S. H. HOWELL,
L. P. NARAMORE.